US011969967B2

(12) United States Patent
Robinson, II et al.

(10) Patent No.: US 11,969,967 B2
(45) Date of Patent: Apr. 30, 2024

(54) SYSTEMS AND METHODS FOR FOLDING AND RETAINING BOX FLAPS

(71) Applicant: Packsize LLC, Salt Lake City, UT (US)

(72) Inventors: Scotty Robinson, II, Lindon, UT (US); Jeremy Brown, Lindon, UT (US); Jeff Edwards, Lindon, UT (US)

(73) Assignee: PACKSIZE LLC, Salt Lake City, UT (US)

( * ) Notice: Subject to any disclaimer, the term of this patent is extended or adjusted under 35 U.S.C. 154(b) by 184 days.

(21) Appl. No.: 17/730,979

(22) Filed: Apr. 27, 2022

(65) Prior Publication Data

US 2022/0347960 A1 Nov. 3, 2022

Related U.S. Application Data

(60) Provisional application No. 63/182,066, filed on Apr. 30, 2021.

(51) Int. Cl.

| | |
|---|---|
| ***B31B 50/72*** | (2017.01) |
| ***B31B 50/26*** | (2017.01) |
| ***B31B 50/81*** | (2017.01) |
| ***B31B 50/88*** | (2017.01) |

(52) U.S. Cl.

CPC .......... *B31B 50/722* (2017.08); *B31B 50/262* (2017.08); *B31B 50/8125* (2017.08); *B31B 50/88* (2017.08)

(58) Field of Classification Search

CPC ....... B65B 7/20; B65B 43/265; B65B 59/003; B65B 1/067; B65B 59/00; B65B 51/00

USPC ................ 493/183, 309, 131, 181, 126, 453

See application file for complete search history.

(56) References Cited

U.S. PATENT DOCUMENTS

| | | | | |
|---|---|---|---|---|
| 2,871,641 | A * | 2/1959 | Tobey | B65B 43/39 53/390 |
| 2,905,066 | A * | 9/1959 | Winkler | B31B 50/00 493/103 |
| 3,662,516 | A * | 5/1972 | Wiseman | B65B 43/39 53/76 |
| 3,695,151 | A | 10/1972 | Caron | |
| 6,578,759 | B1 * | 6/2003 | Ortiz | B65D 5/6614 24/570 |

OTHER PUBLICATIONS

International Search Report and Written Opinion received for PCT Patent Application No. PCT/US2022/026822, dated Aug. 2, 2022, 11 pages.

* cited by examiner

*Primary Examiner* — Jacob A Smith

(74) *Attorney, Agent, or Firm* — WORKMAN NYDEGGER

(57) ABSTRACT

Systems and methods for folding and retaining upper flaps of a box are disclosed. The system includes a conveyor system configured to advance the box at least partially through the system. A flap folding assembly is configured to fold the upper flaps of the box to an open or outwardly folded configuration. The upper flaps are folded outwardly and down towards outer sidewall surfaces of the box in the folded configuration. A bander assembly is configured to apply a band or other restraint to the upper flaps of the box to retain the upper flaps in the folded configuration.

26 Claims, 12 Drawing Sheets

SYSTEMS AND METHODS FOR FOLDING AND RETAINING BOX FLAPS

CROSS-REFERENCE TO RELATED APPLICATIONS

This application claims priority to and the benefit of U.S. Patent Application Ser. No. 63/182,066, filed Apr. 30, 2021, and entitled Systems and Methods for Folding and Retaining Box Flaps, the disclosure of which is incorporated herein by this reference in its entirety.

1. Technical Field

Exemplary embodiments of the disclosure relate to systems, methods, and devices for folding and retaining box flaps. More specifically, exemplary embodiments relate to systems, methods, and devices for folding down upper flaps of an open box against outer sidewalls of the box and retaining the flaps in the folded position.

2. Related Technology

Shipping containers, including boxes formed of corrugate boards, are commonplace. There are a variety of systems, machines, and devices used for creating such shipping containers. These systems, machines, and devices typically form cuts and creases in a raw material (e.g., corrugate boards) to create a box blank. The box blank is then erected into a box. To erect the box blank into a box, the box blank is typically folded and opposing ends thereof are connected together (e.g., via glue, tape, staples, etc.) to form a manufacturer's joint. Bottom flaps of the partially erected box are then folded closed and secured in place (e.g., with glue, tape, staples, etc.) to form a bottom surface of the box. The box can then be filled with items and the top flaps can be folded closed and secured in place (e.g., with glue, tape, staples, etc.) to close the box and form a top surface thereof.

Historically, box blanks were formed with a system, machine, or device and then a person would erect the box blank into a box, fill the box, and close the top flaps. With the more recent focus on automation, systems, machines, and devices have been developed to erect box blanks into open boxes (e.g., boxes with closed bottoms and open tops). Additionally, systems, machines, and devices have and are being developed to fill open boxes and close the top flaps of the boxes after the boxes are filled.

Automated systems, machines, and devices that create, erect, fill, and close boxes have significantly decreased the amount of manual labor required for such processes and have increased the number of boxes that can be made and filled. However, there are still challenges that remain with handling such boxes.

BRIEF SUMMARY

In one exemplary embodiment, a system is provided for folding and retaining upper flaps of an open box. The system includes a conveyor system configured to advance the open box at least partially through the system. The system also includes a flap folding assembly that is configured to fold the upper flaps of the box to an open or outwardly folded configuration. The upper flaps are folded down towards outer sidewall surfaces of the box in the open or outwardly folded configuration. The system also includes a bander assembly that is configured to apply a band or other restraint to the upper flaps of the box to retain the upper flaps in the open or outwardly folded configuration.

According to another embodiment, a system for folding and retaining upper flaps of an open box includes a flap folding assembly and a bander assembly. The flap folding assembly is configured to fold the upper flaps of the box to an open or outwardly folded configuration. The upper flaps are folded down towards outer sidewall surfaces of the box in the open or outwardly folded configuration. The flap folding assembly includes a carriage assembly, first and second opposing flap folders, and third and fourth opposing flap folders. The first and second opposing flap folders are connected to the carriage assembly and are configured to move closer together and further apart from one another parallel to a first axis. The third and fourth opposing flap folders are connected to the carriage assembly and configured to move closer together and further apart from one another parallel to a second axis. The bander assembly is configured to apply a band or other restraint to the upper flaps of the box to retain the upper flaps in the open or outwardly folded configuration.

In still another embodiment, a method for folding and retaining upper flaps of a box in a folded configuration is provided. The method includes providing an open box with upwardly extending upper flaps and folding the upper flaps to an open or outwardly folded configuration. The upper flaps are folded toward outer sidewall surfaces of the box when in the open or outwardly folded configuration. The method also includes applying a band or other restraint to the upper flaps while the upper flaps are in the open or outwardly folded configuration. The band or other restraint is configured to hold the upper flaps in the open or outwardly folded configuration.

These and other objects and features of the present disclosure will become more fully apparent from the following description and appended claims or may be learned by the practice of the disclosure as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

While the present disclosure will describe details of embodiments with reference to specific configurations, the descriptions are illustrative and are not to be construed as limiting the scope of the present invention. Various modifications can be made to the illustrated configurations without departing from the spirit and scope of the invention as defined by the claims. For better understanding, like components have been designated by like reference numbers throughout the various accompanying figures.

Figure 1:
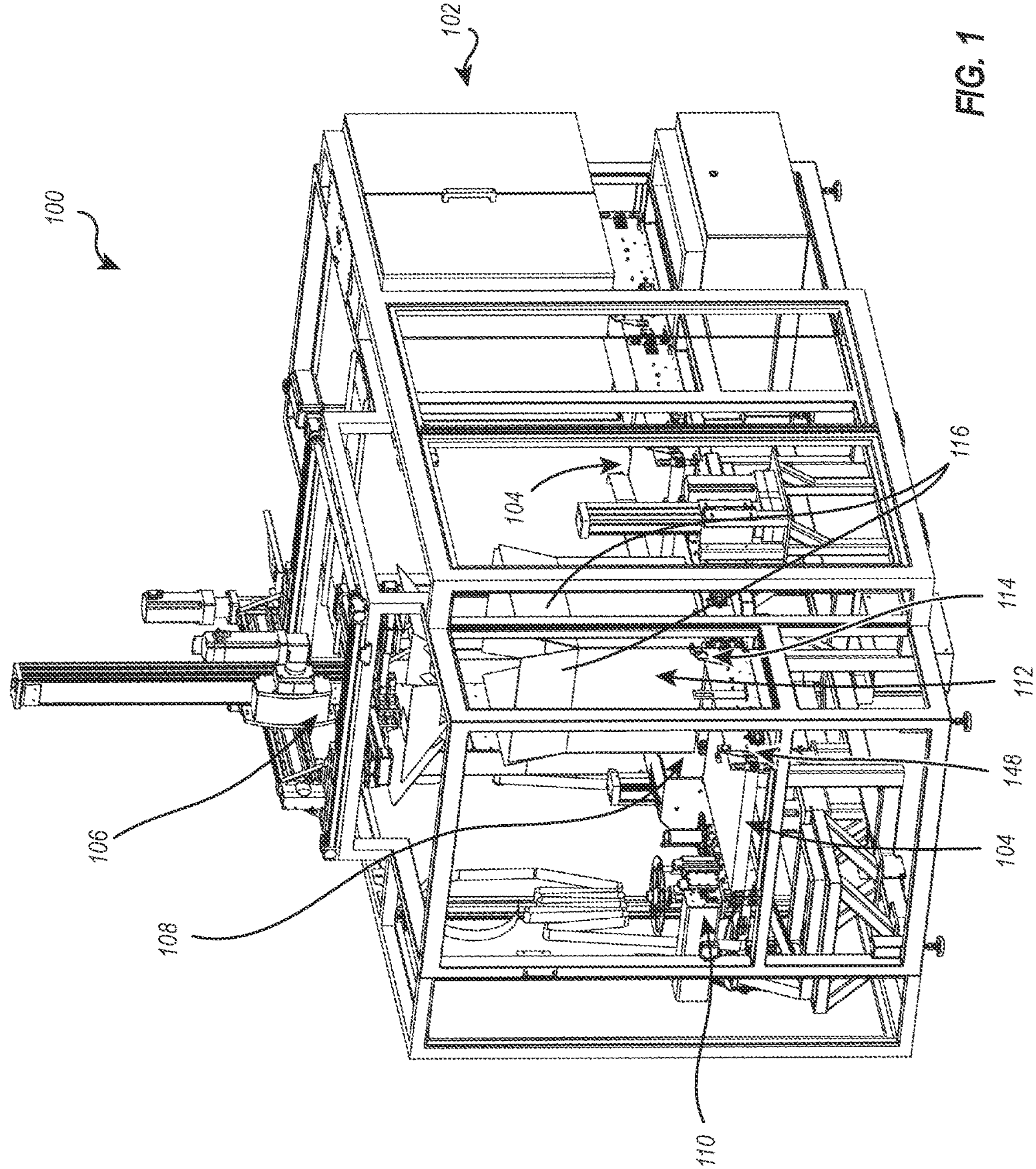
FIG. 1 illustrates an example embodiment of a system for folding down and retaining top flaps of a box.

Exemplary embodiments of the disclosure relate to systems, methods, and devices for folding down upper flaps of an open box against outer sidewalls of the box and retaining the flaps in the open or outwardly folded position. For instance, FIG. 1 illustrates a system 100 for folding down and retaining top flaps of a box. Generally, the system 100 may include one or a combination of a frame 102, a conveyor system 104, a flap folding assembly 106, a bander assembly 108, and a print assembly 110.

The conveyor system 104 may be associated with the frame 102 either by being positioned adjacent or connected thereto. The conveyor system 104 may include one or more conveyor belts and/or other advancement mechanisms (e.g., rollers, wheels, etc.) that are configured to advance a box there along. For instance, the conveyor system 104 may advance a box 112 at least partially through the system 100.

At certain points within the system 100, the conveyor system 104 may pause or stop the advancement of the box 112. For instance, the conveyor system 104 may temporarily stop the advancement of the box 112 when the conveyor system 104 has advanced the box 112 so that the box 112 is positioned generally underneath the flap folding assembly 106. In some embodiments, the system 100 may include one or more sensors 114 that monitor or detect the position of the box 112 as the box 112 moves through the system 100. When the one or more sensors 114 detect that the box 112 is positioned below the flap folding assembly 106, the one or more sensors 114 may direct a signal to the conveyor system 104 (directly or via a control system of the system 100) that causes the conveyor system 104 to stop the movement of the box 112 so that the box 112 is, at least temporarily, positioned stationary under the flap folding assembly 106.

As described in greater detail below, the flap folding assembly 106 may fold down upper flaps 116 of the box 112 to an open or outwardly folded position and the bander assembly 108 may apply a band or other restraint to the box 112 to hold the upper flaps 116 in the open or outwardly folded position. In the open or outwardly folded position, the upper flaps 116 of the box 112 are folded outwardly and down towards (an optionally into contact with) outer sidewalls of the box 112. After the flap folding assembly 106 has folded the upper flaps 116 and the bander assembly 108 has applied a band or restraint to the box 112 to hold the upper flaps 116 in the open or outwardly folded position, the conveyor system 104 may advance the box 112 further through and/or out of the system 100.

Figure 2:
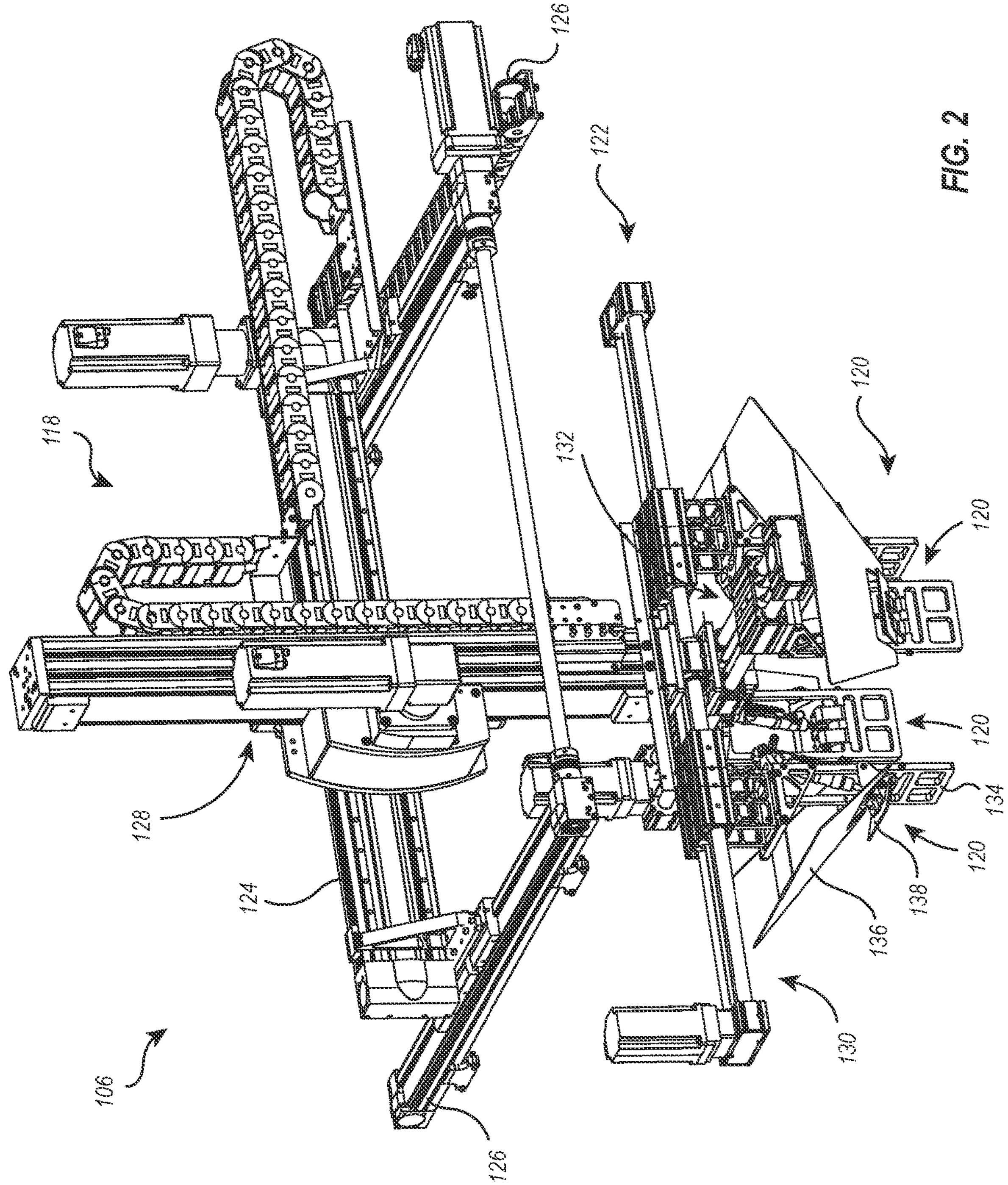
FIG. 2 illustrates an example embodiment of a flap folding assembly of the system of FIG. 1.

With continued reference to FIG. 1, attention is also directed to FIG. 2, which illustrates the flap folding assembly 106 apart from the rest of the system 100. As can be seen, the flap folding assembly 106 includes a carriage assembly 118 that can be mounted on the frame 102. The flap folding assembly 106 also includes a plurality of flap folders 120. The flap folders 120 may be connected to the carriage assembly 118 via a subframe or sub-carriage 122.

In the illustrated embodiment, the carriage assembly 118 includes a gantry 124 movably mounted on one or more support tracks 126 such that the gantry 124 can be moved in first and second opposing directions between opposing ends of the one or more support tracks 126. Such movement of the gantry 124 can facilitated by a motor and can selectively reposition the plurality of flap folders 120 along the width of the conveyor system 104. This can be useful to align the flap folders 120 with a box 112 positioned on the conveyor system 104. For instance, if a new box 112 on the conveyor system 104 is wider or narrower than a previous box 112 on the conveyor system 104, the gantry 124 can be moved lateral across the width of the conveyor system 104 to generally align the flap folders 120 with the top of the new box 112.

In addition or alternatively to facilitating lateral movement of the flap folders 120 (e.g., across the width of the conveyor system 104), the carriage assembly 118 may facilitate movement of the flap folders 120 along a portion of the length of the conveyor system 104. As illustrated, the flap folders 120 may be connected to the gantry 124 via an arm 128. The arm 128 may be movably connected to the gantry 124 such that the arm 128 may move along at least a portion of the length of the gantry 124. The arm 128 may be actively moved along the gantry 124 via a motor.

The movement of the arm 128 relative to the gantry 124 can be useful to align the flap folders 120 with a box 112 positioned on the conveyor system 104. For instance, if a new box 112 on the conveyor system 104 is longer or shorter than a previous box 112 on the conveyor system 104, the arm 128 can move along the gantry 124 and along the length of the conveyor system 104 to generally align the flap folders 120 with the top of the new box 112.

Additionally, the arm 128 may be movably connected to the gantry 124 such the arm 128 (and the connected flap folders 120 and sub-carriage 122) can move up and down in a reciprocating manner relative to the gantry 124 and/or the conveyor system 104 and/or parallel to a first or z-axis. Such movement may be driven by a motor. As will be described in greater detail below, such up and down or vertical movement of the arm 128 facilitates insertion of the flap folders 120 into a box 112 and removal therefrom.

The above-noted movements of the gantry 124 (e.g., along the support tracks 126) and the arm 128 (e.g., along the gantry 124) can enable movement of the plurality of flap folders 120 together as a group (laterally, longitudinally, and/or vertically). The flap folders 120 may, also or alternatively, be movable relative to one another. For instance, the connection between the flap folders 120 and the sub-carriage 122 may allow for relative movement between the flap folders 120.

For instance, the flap folding assembly 106 may include four flap folders 120. The four flap folders 120 may be mounted to the sub-carriage 122 in manner that enables the four flap folders 120 to move relative to one another. In the illustrated embodiment, the flap folders 120 are arranged in opposing pairs, which first and second flaps folders 120 positioned opposite to one another and third and fourth flap folders 120 positioned opposite to one another. The first and second flap folders 120 may be offset from the third and fourth flap folders 120 by about 90 degrees.

The flap folders 120 may be connected to the sub-carriage 122 in a manner that allows for reciprocating movement of the flap folders 120 parallel to one or more other axes (e.g., x- and/or y-axes for horizontal movement). For instance, the first and second flap folders 120 may be mounted to one or more tracks or guides 130 on the sub-carriage 122 in manner that enables the first and second flap folders 120 to move (horizontally) parallel to a second or x-axis (that is generally aligned with the length of the conveyor system 104). Such movement of the first and second flap folders 120 enables the first and second flap folders 120 to be moved closer together or further apart based, at least in part, on the length or width of the box 112. The sub-carriage 122 may include a motor or other actuator that facilitates movement of the first and second flap folders 120 parallel to the second or x-axis.

Similarly, the third and fourth flap folders 120 may be mounted to one or more tracks or guides 132 on the sub-carriage 122 in manner that enables the third and fourth flap folders 120 to move (horizontally) parallel to a third or y-axis (that is generally transverse to the width of the conveyor system 104). Such movement of the third and fourth flap folders 120 enables the third and fourth flap folders 120 to be moved closer together or further apart based, at least in part, on the other of the length or the width of the box 112. The sub-carriage 122 may also include a motor or other actuator that facilitates movement of the third and fourth flap folders 120 parallel to the third or y-axis.

As shown in FIG. 2, each of the flap folders 120 includes a first clamp member 134, an angled plate 136, and a second clamp member 138. As will be discussed in greater detail below, the angled plate 136 is configured to engage and outwardly bend or deflect an upper flap 116 on the box 112. Thereafter, the second clamp member 138 is configured to further fold the upper flap 116 towards a sidewall of the box 112 such that the upper flap 116 and the sidewall are clamped between the first and second clamp members 134, 138.

Figure 3:
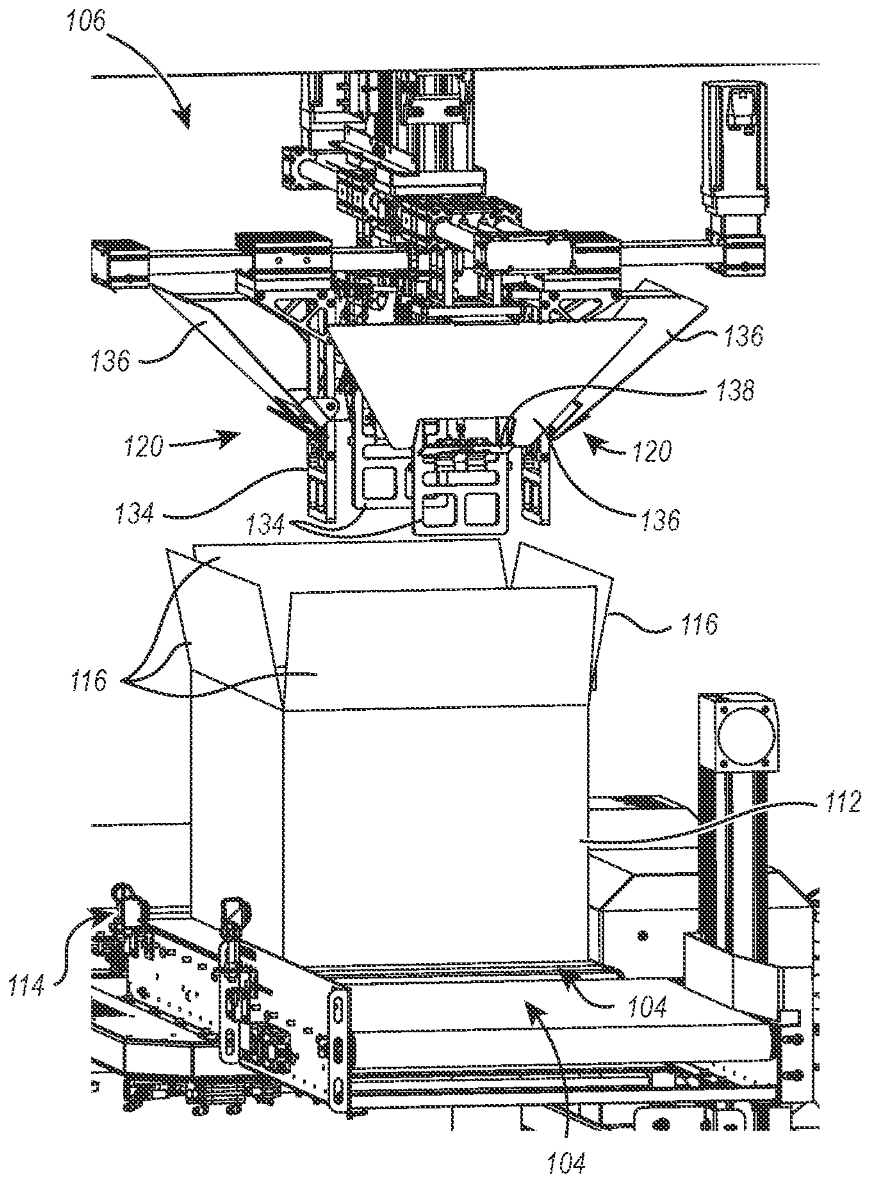
FIG. 3 illustrates the system of FIG. 1 with a box positioned under the flap folding assembly.

Attention is now directed to FIG. 3, which illustrates the conveyor system 104 advancing a box 112 there along so as to position the box 112 under the flap folding assembly 106. In the illustrated embodiment, the flap folders 120 are in a raised position to enable the box 112 to be advanced thereunder. The opposing sets of flap folders 120 are also moved closer to one another.

As the box 112 is advanced under the flap folding assembly 106 or shortly therebefore, the flap folding assembly 106 may be adjusted to accommodate the particular size (e.g., length, width, height) of the box 112. For instance, depending on the height of the box 112, the flap folders 120 may be raised or lowered (e.g., moved parallel to the first or z-axis) far enough to enable the box 112 to pas thereunder. Similarly, depending on the length and/or width of the box 112, the flap folders 120 may be moved as a group via the movement of the gantry 124 and/or the arm 128. The opposing sets of flap folders 120 may also or alternatively be moved closer together or further apart (e.g., moved parallel to the second/x- and/or third/y-axis) so as to generally correspond to the length and width of the box 112.

Figure 4:
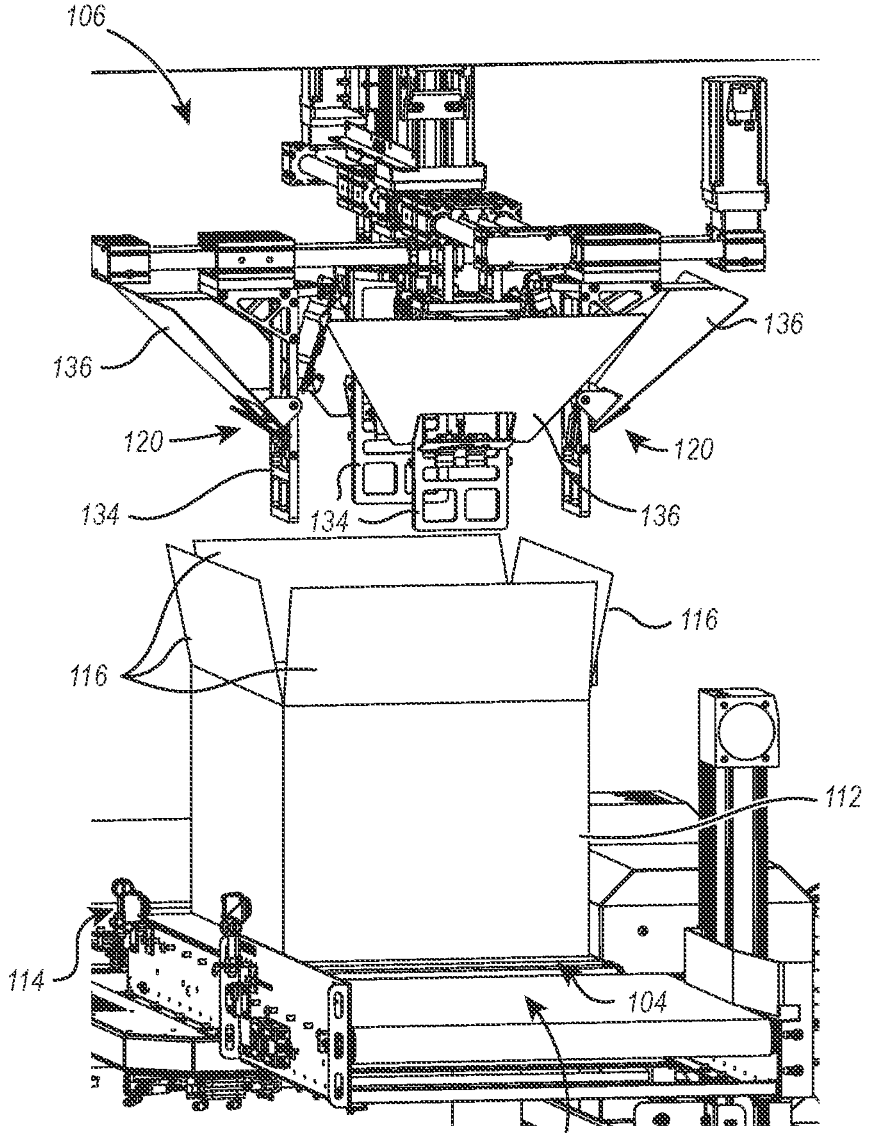
FIG. 4 illustrates the system of FIG. 1 with the flap folding assembly adjusted to accommodate the particular box size.

For instance, a comparison between FIGS. 3 and 4 reveals that as the box 112 approaches or is positioned under the flap folding assembly 106, the flap folders 120 move further apart from one another. In the illustrated embodiment, the flap folders 120 are moved so that the first clamp members 134 on opposing flap folders 120 are spaced apart a distance that is slightly less than (e.g., equal to or less than 1 inch, 0.5 inches, 0.25 inches, 0.1 inches) a length or a width of the box 112. Depending on the length and width of the box 112, the flap folders 120 may move closer together or further part as the box 112 approaches or is positioned underneath the flap folding assembly 106.

Once the box 112 is positioned under the flap folding assembly 106 and the flap folders 120 are properly spaced apart (e.g., so the opposing first clamp members 134 are spaced apart by distances slightly less than the length and width of the box), the flap folders 120 may be lowered or moved towards the box 112. For instance, as shown in FIG. 5, the flap folders 120 are lowered such that the flap folders 120 are partially inserted into the open upper end of the box 112.

Notably, as shown in FIGS. 1-4, the angled plates 136 are angled such that lower ends thereof are closer together than upper ends thereof. Additionally, as can be seen in the Figures, the lower ends of each angled plates 136 can optionally be narrower than the upper ends thereof. As a result, each angled plate 136 can have a tapered configuration (e.g., wider at the upper end and narrower at the lower end).

Figure 5:
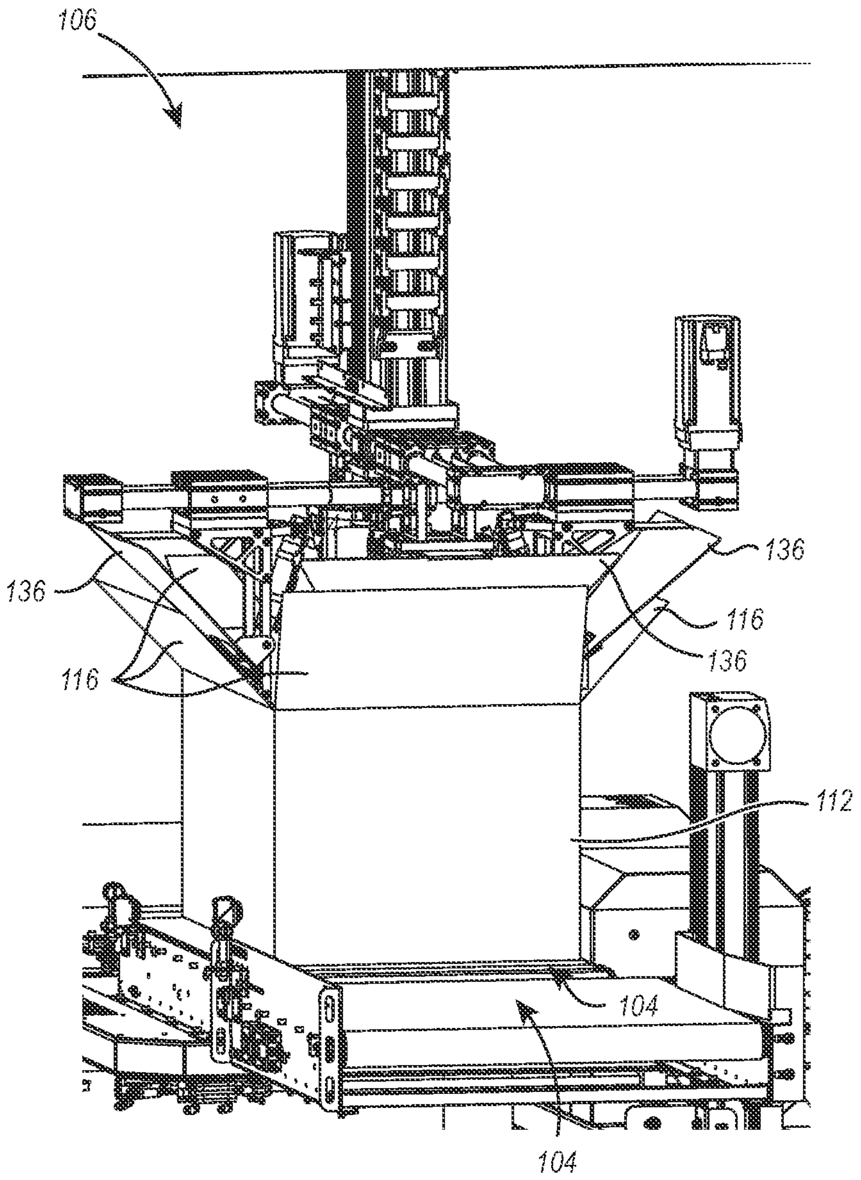
FIG. 5 illustrates the system of FIG. 1 with the flap folding assembly partially lowered into a box to outwardly deflect the upper flaps of the box.

As the flap folders 120 are inserted into the box 112 as shown in FIG. 5, the first clamp members 134 are positioned adjacent to or against the interior surfaces of the sidewalls of the box 112. Additionally, the angled plate 136 engage the upper flaps 116 of the box 112. Because the angled plates 136 are angled outward (e.g., the upper ends are spaced further apart than the lower ends), engagement of the angled plates 136 with the upper flaps 116 of the box 112 cause the upper flaps 116 to bend or deflect outward as shown in FIG. 5.

Figure 6:
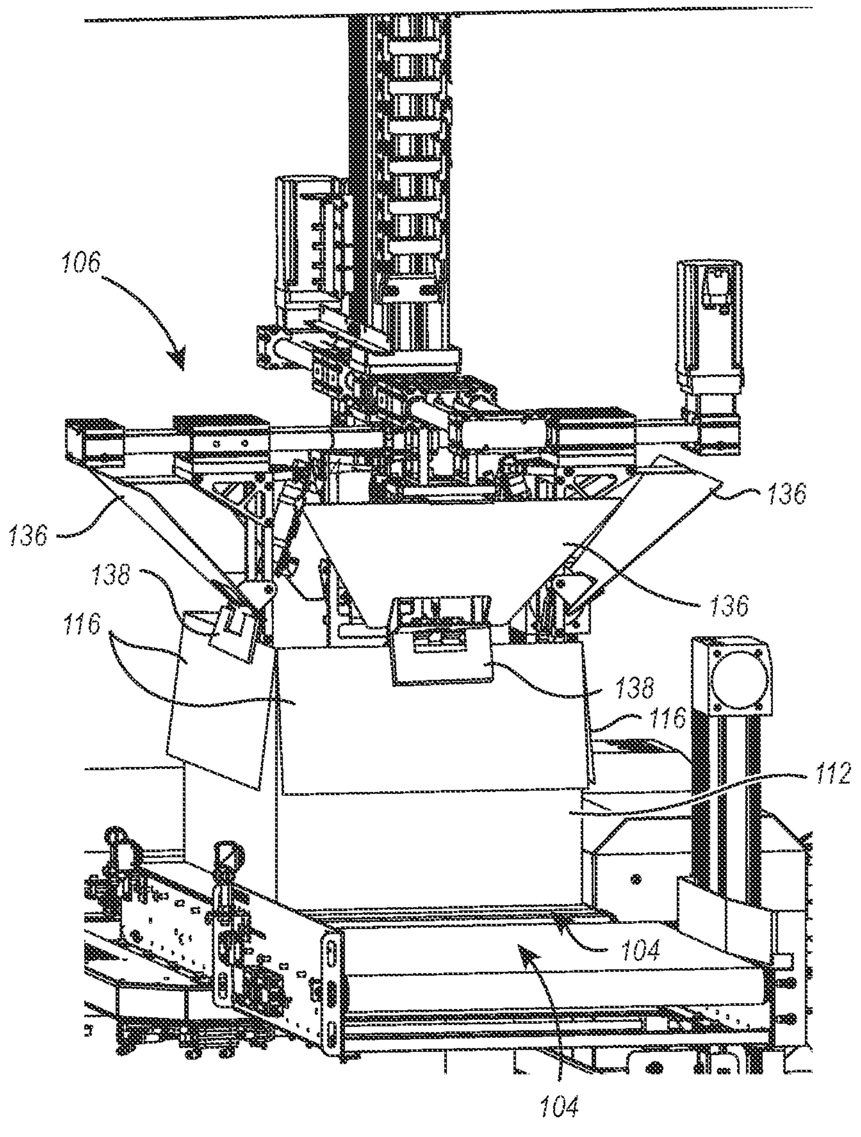
FIG. 6 illustrates the system of FIG. 1 with the flap folding assembly folding down the upper flaps of the box outwardly and down towards the outside surfaces of the box sidewalls.

With the upper flaps 116 deflected outward, the flap folders 120 can fold the upper flaps 116 outward and down towards the outer surfaces of the sidewalls of the box 112. For instance, as shown in FIG. 6, second clamp members 138 on the flap folders 120 can be activated to fold down the upper flaps 116. An actuator can rotate or linearly move the second clamp members 138 into engagement with the inner surfaces of the upper flaps 116. The movement of the second clamp members 138 can apply a force on interior surfaces of the upper flaps 116 that causes the upper flaps 116 to be folded outward and down towards the outer surfaces of the sidewalls of the box 112.

In some embodiments, the first and second clamp members 134, 138 clamp the upper flaps 116 and the sidewalls of the box 112 therebetween. In some embodiments, the first clamp members 134 provide a stabilizing or opposing force to the second clamp members 138 to facilitate folding of the upper flaps 116 and/or to limit or prevent movement of the sidewalls of the box 112 as the upper flaps 116 are being folded.

In some embodiments, the second clamp members 138 are configured to fold the upper flaps 116 completely against the outer surfaces of the sidewalls of the box 112. In other embodiments, the second clamp members 138 are configured to fold down the upper flaps 116 so that the upper flaps 116 and the sidewalls of the box 112 form an angle equal to or less than 75 degrees, 60 degrees, 45 degrees, 30 degrees, or 15 degrees, or any angle therebetween.

In any event, the second clamp members 138 can hold the upper flaps 116 in the folded configuration while a restraining element is applied to the box 112. For instance, while the second clamp members 138 are holding the upper flaps 116 in the open or outwardly folded positions, the bander assembly 108 may be configured to apply a band or other restraint to the upper flaps 116 to hold the upper flaps 116 in the open or outwardly folded configuration.

Figure 7:
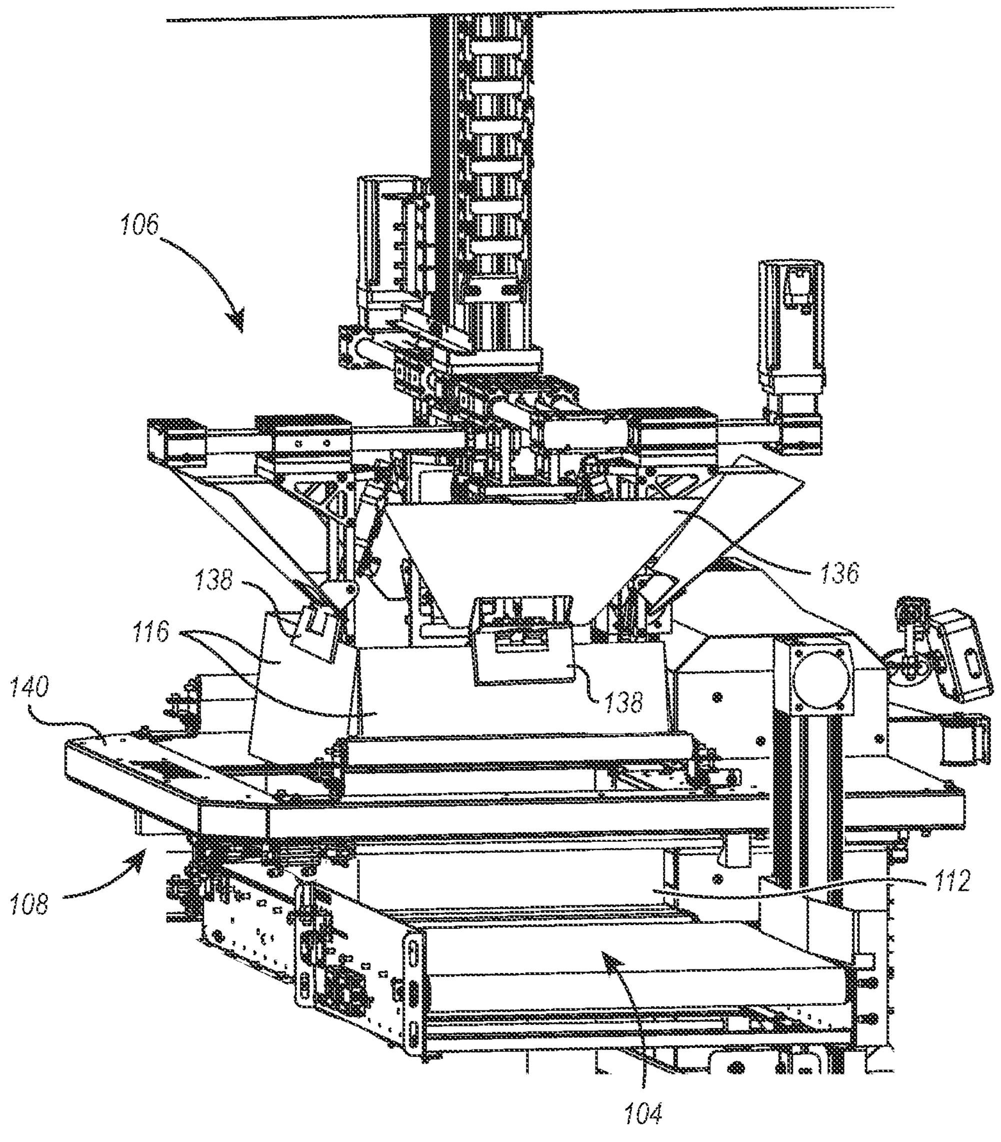
FIG. 7 illustrates the system of FIG. 1 with a bander assembly moved to a raised position around the box.
Figure 8:
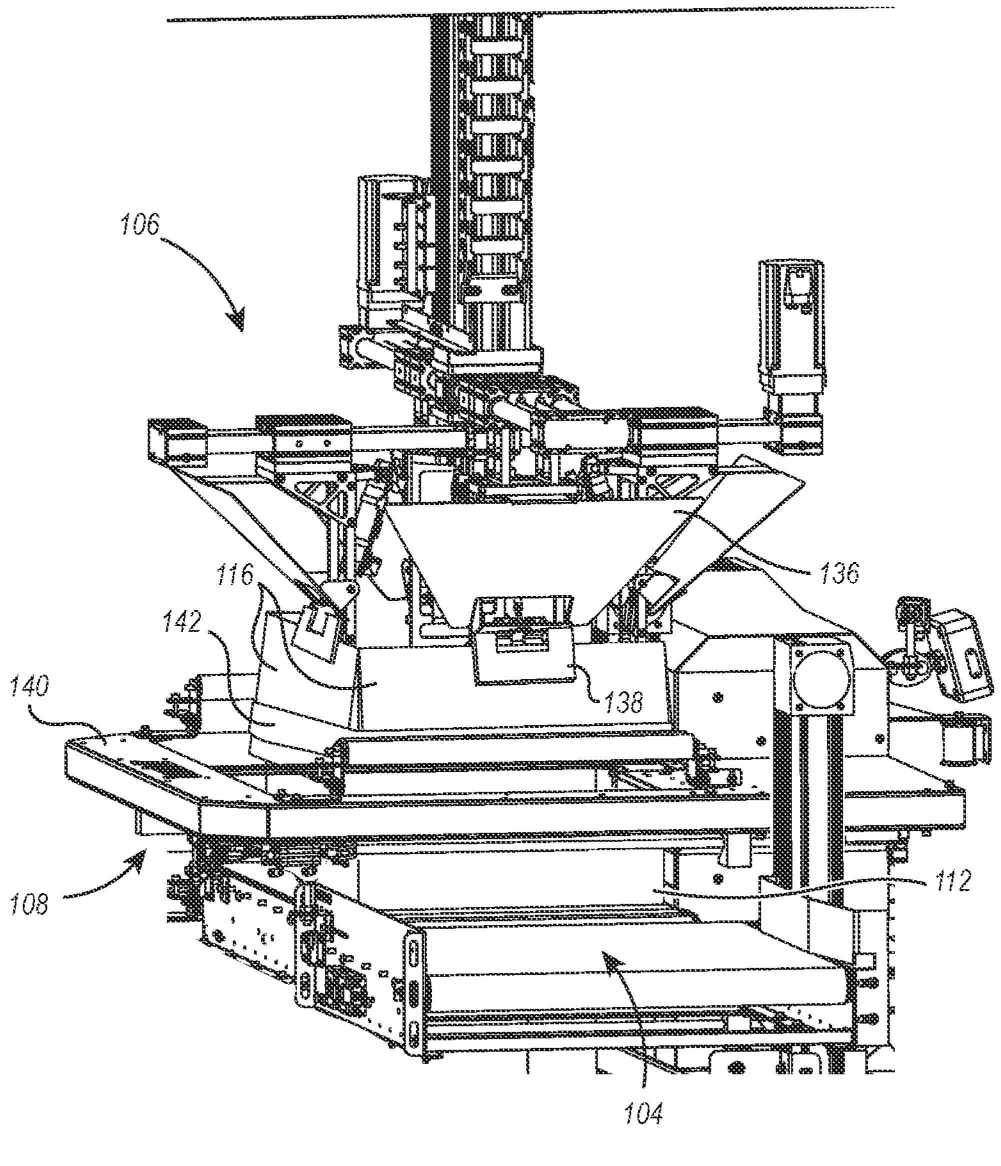
FIG. 8 illustrates the system of FIG. 1 with the bander assembly applying a band to the box.

As shown in FIG. 7, a banding frame 140 of the bander assembly 108 may be moved to a raised or functional position. In the raised or functional position, at least part of the banding frame 140 may extend around the box 112 and be disposed at a height between the upper and lower ends of the folded upper flaps 116. Once the banding frame 140 is in position, the bander assembly 108 may apply a band or other restraint 142 to the upper flaps 116 to hold the upper flaps 116 in the folded configuration, as shown in FIG. 8. For instance, a band or other restraint 142 may be extended around the box 112 and released from the banding frame 140 and secured around the upper flaps 116. In some embodiments, the band or other restraint 142 extends around the exterior of the box 112 and holds the upper flaps 116 in the open or outwardly folded configuration. In some embodiments, the band or other restrain 142 comprises paper, plastic, rubber, vinyl, cloth, or the like.

Figure 9A:
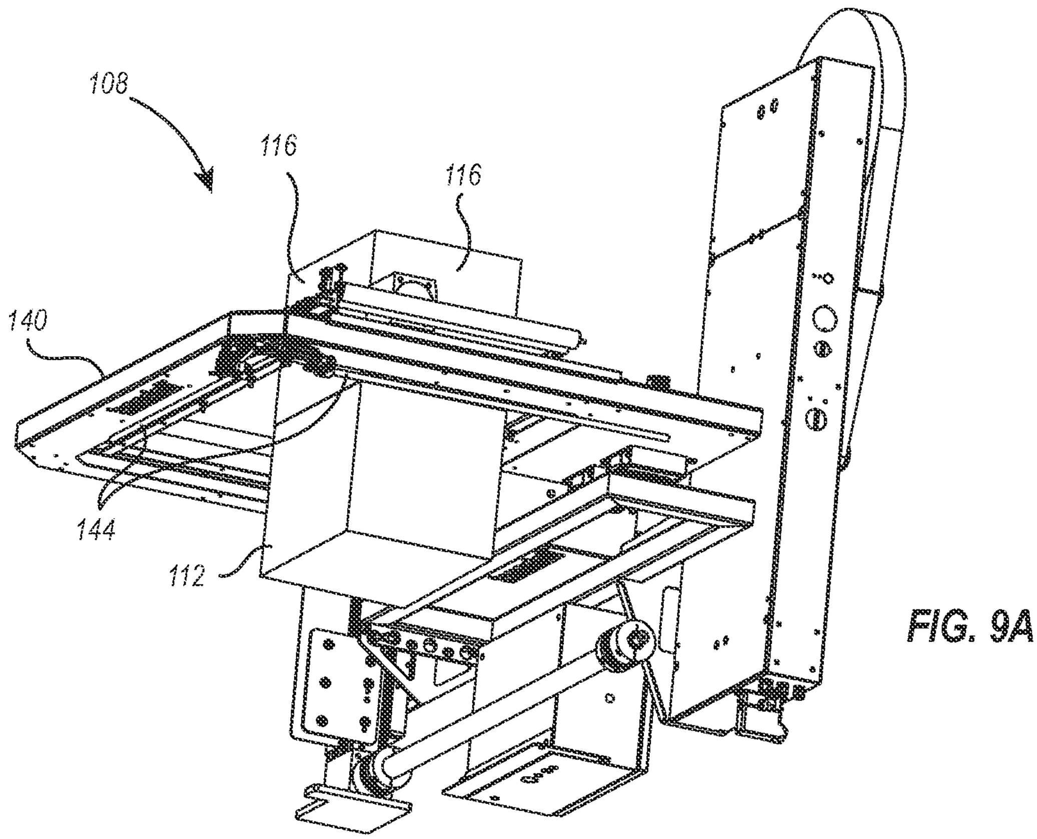
FIGS. 9A and 9B illustrates an underside of the bander assembly applying, including support or guide arms thereof.
Figure 9B:
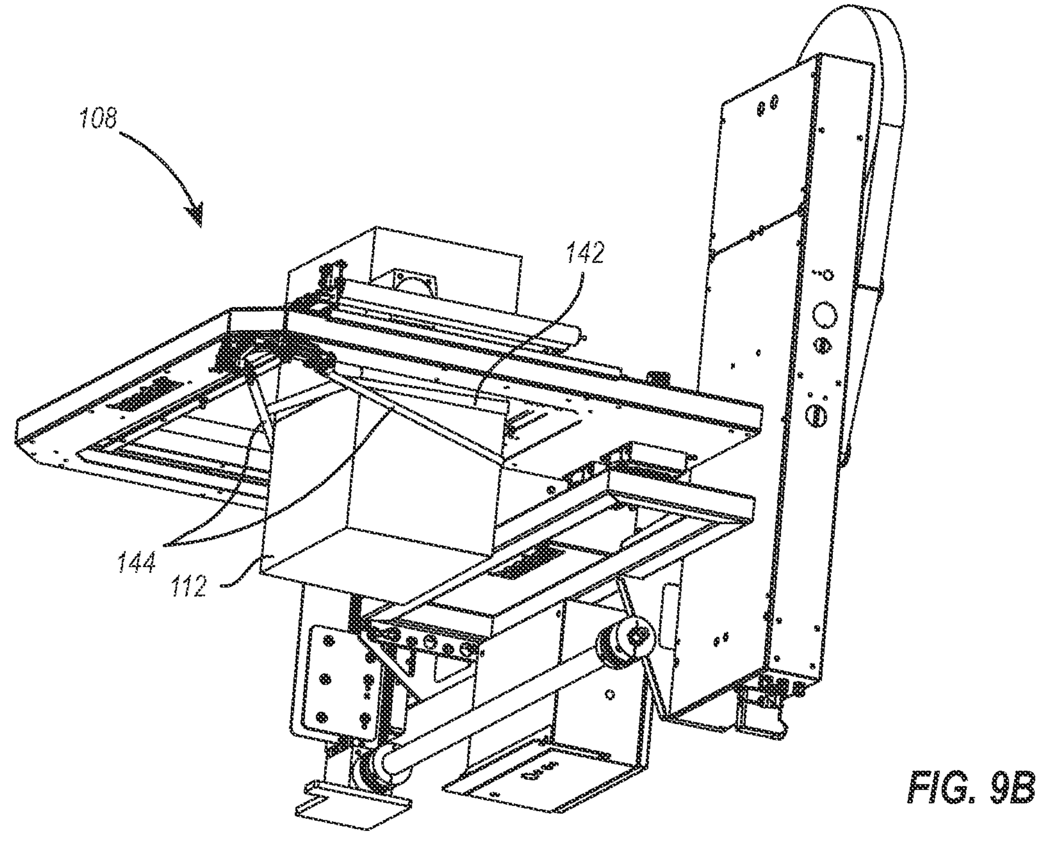

FIGS. 9A and 9B illustrate lower perspective views of the bander assembly 108. Similar to FIGS. 7 and 8, the banding frame 140 is in the raised or functional position so that the banding frame 140 extends around the box 112 and is disposed at a height between the upper and lower ends of the folded upper flaps 116 of the box 112. As can be seen, the bander assembly 108 includes one or more support or guide arms 144. In the illustrated embodiment, the support or guide arms 144 are connected to an underside of the banding frame 140.

As can be seen through a comparison between FIGS. 9A and 9B, the support or guide arms 144 are configured to be selectively moved between a storage or inactive position (FIG. 9A) and an active position (FIG. 9B). When the support or guide arms 144 are in the inactive position, the support or guide arms 144 are positioned below the banding frame 140. When in the inactive position, the support or guide arms 144 do not interfere with the movement of the banding frame 140 to or from the raised or functional position. That is, the support or guide arms 144 do not contact or otherwise engage the conveyor system 104, the box 112, or other components of system 100 in a way that would inhibit movement of the banding frame 140.

In contrast, once the banding frame 140 is in the raised or functional position, the support or guide arms 144 can be deployed (e.g., moved from the inactive position to the active position). In the illustrated embodiment, the support or guide arms 144 can be deployed by pivoting from the inactive position to the active position as shown in FIG. 9B. In other embodiments, the support or guide arms 144 may move linearly, pivot, or a combination thereof to move between the inactive and active positions.

Deployment of the support or guide arms 144 may comprise movement there of through a predefined distance or until a predefined event occurs. For instance, deployment of the support or guide arms 144 may include movement thereof until a portion thereof contacts the box 112.

With the support or guide arms 144 in the active position, the bander assembly 108 may apply the band (or other restraint) 142 to the box 112 to hold the upper flaps 116 in the open or outwardly folded configuration. The support or guide arms 144 may be configured to support and/or guide the band 142 as it is applied to the box 112. For instance, the support or guide arms 144 may support and guide the band 142 as it moves towards the box 112 so that the band 142 is applied to the desired portion of the box 112 (e.g., around the downwardly folder upper flaps 116). Thus, the support or guide arms 144 may prevent the band 142 from following below the upper flaps 116 during application of the band 142.

Figure 10:
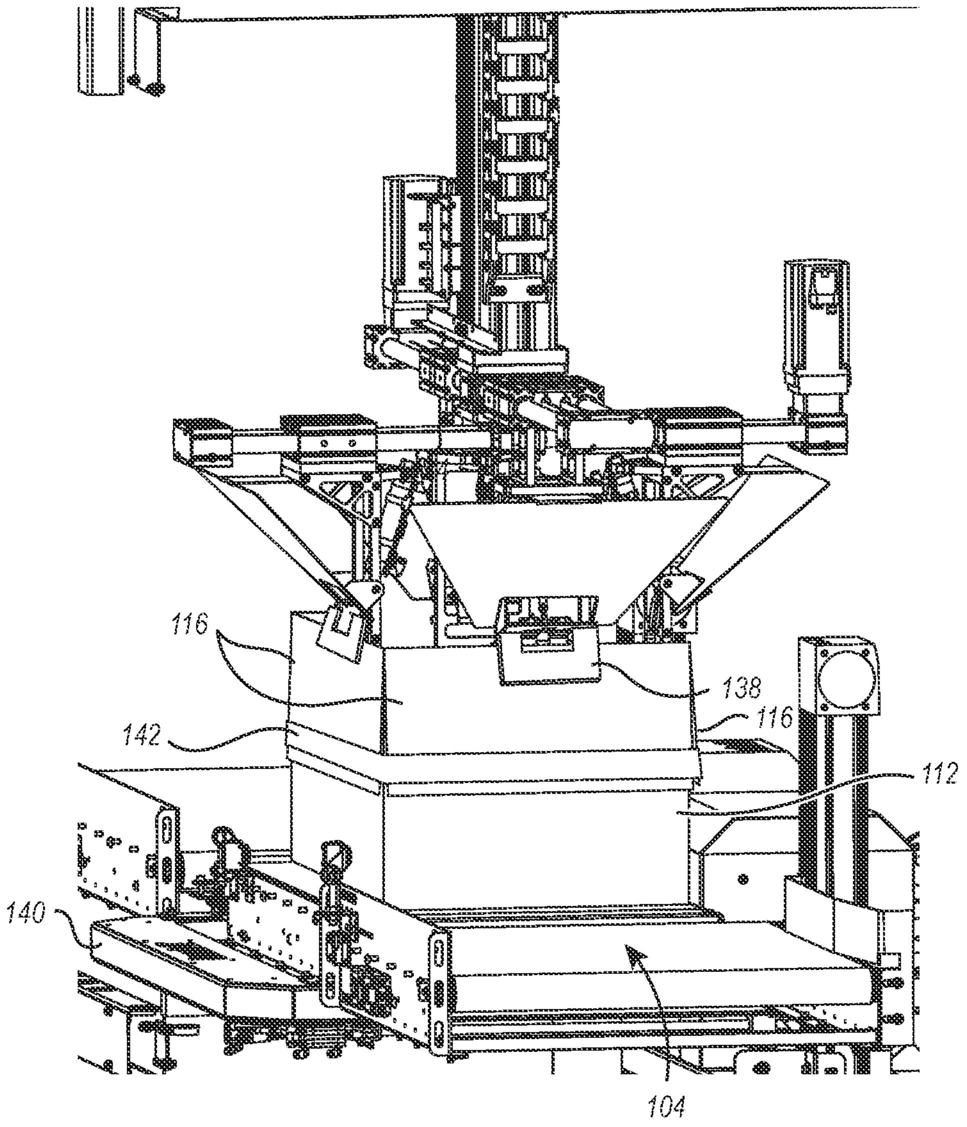
FIG. 10 illustrates the system of FIG. 1 with the bander assembly being moved to a lowered position.
Figure 11:
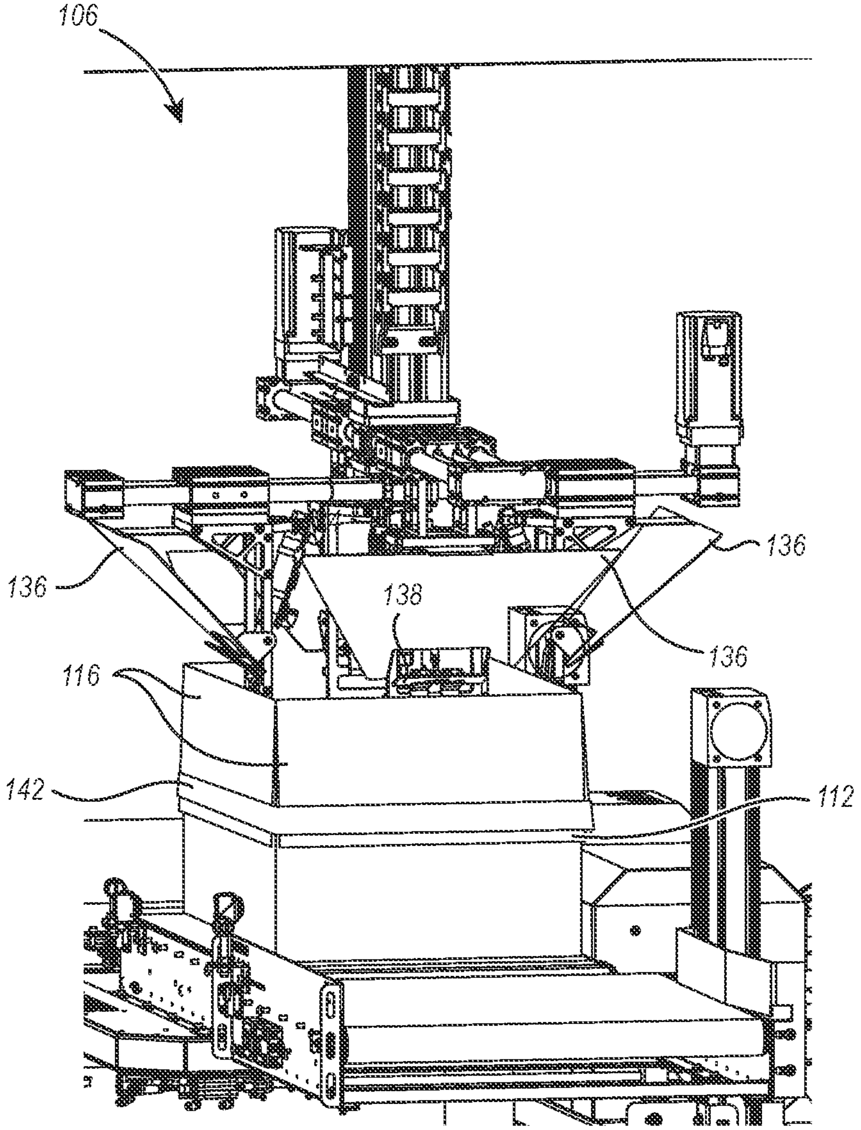
FIG. 11 illustrates the system of FIG. 1 with the flap folding assembly partially retracted from the box.
Figure 12:
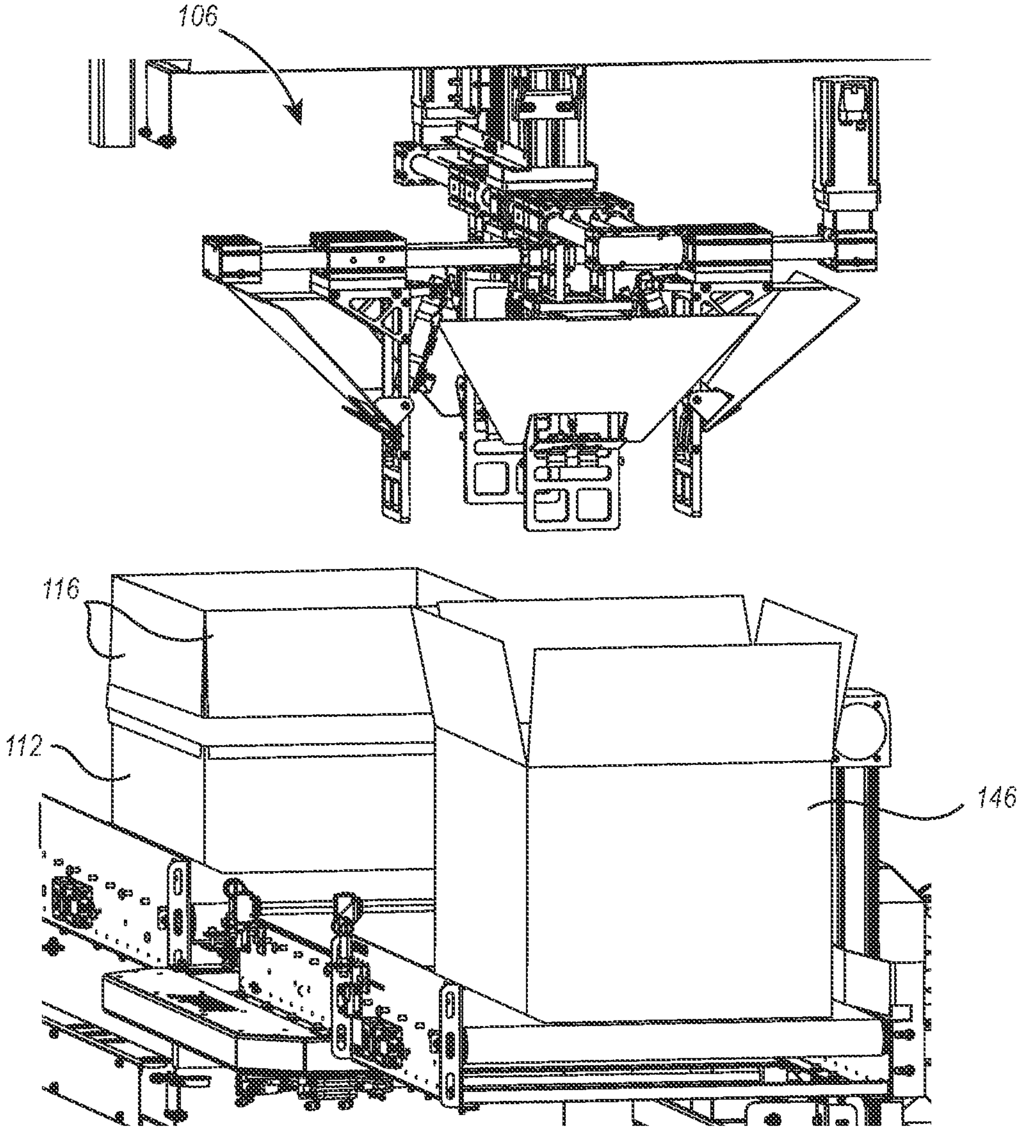
FIG. 12 illustrates the system of FIG. 1 with the flap folding assembly fully retracted from the box.

Once the band or other restraint 142 is applied to the upper flaps 116, the banding frame 140 may be lowered or otherwise removed from around the box 112. For instance, FIG. 10 illustrates the banding frame 140 being lowered to a position below the conveyor system 104. While or after the banding frame 140 is completely lowered or otherwise removed from around the box 112, the second clamp members 138 may be retracted as shown in FIG. 11. Thereafter, the flap folders 120 can be retracted from within the box 112 as shown in FIG. 12 (e.g., by moving the flap folders 120 along the first or z-axis and away from the box 112).

With the band 142 applied to the box 112 and the flap folders 120 and bander assembly 108 retracted, the conveyor system 104 can then advance the box 112 further through or out of the system 100. The conveyor system 104 can then advance another box 146 towards/underneath the flap folding assembly 106.

Returning attention to FIG. 1, as the box 112 advances further along the conveyor system 104, the box 112 may be positioned adjacent to or pass by the print assembly 110. In some embodiments, the system 100 includes one or more sensors 148 that detect when the box 112 is positioned adjacent to or passing by the print assembly 110. Such detection by the one or more sensors 148 may cause the conveyor system 104 to stop moving so that the box 112 is positioned stationary adjacent to the print assembly 110. Alternatively, such detection by the one or more sensors 148 may activate the print assembly 110.

The print assembly 110 may print indicia (e.g., words, numbers, pictures, logos, barcodes, etc.) on the box 112. Additionally or alternatively, the print assembly 110 may apply one or more labels to the box 112. The indicia and/or labels may be applied while the box 112 is positioned stationary and adjacent to the print assembly 110. Additionally or alternatively, the indicia and/or labels may be applied while the box 112 moves past the print assembly.

In some embodiments, the print assembly 110 prints the indicia or applies the labels to one or more outside surfaces of the sidewalls of the box 112. For instance, the print assembly 110 may print the indicia or apply the labels to the lower portions of the sidewalls of the box 112. The lower portion of a sidewall of the box 112 may include the area between a lower edge of the sidewall and the downwardly folder upper flap 116. In some embodiments, the print assembly 110 may print indicia on or apply labels to the outwardly facing surfaces of the upper flaps 116.

Retaining the upper flaps of an open box in a folded configuration as described herein can provide various benefits. For instance, if manual labor is used to fill boxes with items, the packer typically has to lift the to-be-packaged items high enough to clear the upwardly extending upper flaps of the box and then lower the items into the box. Such process can require a significant range of motion for the packer, which done repetitively and/or with heavy objects, can lead to fatigue and/or injury to the packer.

To avoid a packer having to lift the items up and over the upwardly extending flaps and then lower them into the box, the box may be positioned at a lower height. In such case, the packer does not have to lift the items as high to get up and over the upwardly extending flaps. However, the packer may be forced to repeatedly bend further over to place items in the lower boxes. Again, such movements can lead to fatigue and possible injury to the packer.

In contrast, by folding and retaining the upper flaps as described herein, a packer does not have to lift the items has high, since the upper flaps are folded down. Additionally, the packer does not have to reach as deep into the box to place the items therein. Similarly, because the height of the box is shorter with the flaps folded down, there is less need to place the box on a lower surface that would require the packer to repeatedly bend over to fill the box.

Even in situations where manual labor is not used to fill the boxes, having the upper flaps folded and retained in place can provide various benefits. For instance, in an autonomous environment where machines fill the boxes, reducing the height of the open boxes (by folding down and retaining the upper flaps as described herein) allows for lower clearances of automated machine components. For instance, the automated machines that place items into the boxes can have smaller vertical ranges because the machines do not have to rise far enough to clear the upwardly extending upper flaps.

In any event, once the box is filled and ready to be closed, the band or other restraint can be removed from the box. Removing the band or other restraint frees the upper flaps of the box and enables the upper flaps to be folded and secured closed (e.g., with tape, glue, staples, etc.).

As described herein, the system 100 may be configured to fold down upper flaps of a box, apply a band or other restraint thereto, and optionally print on or apply a label to the box. In some instances, however, a box may have dimensions that reduce or eliminate the need to fold down and retain the upper flaps thereof. For instance, if the overall height of the open box (e.g., height of the sidewalls and upwardly extending upper flaps) is less than a predetermined height (e.g., 12 inches, 18 inches, 20 inches, 24 inches, 30 inches, or any other height less than, greater than, or in between the noted heights), the system 100 may forego folding down and restraining the upper flaps in the downwardly folded configuration. That is, the system 100 may not fold down the upper flaps or apply a band or other restraint thereto. However, the system 100 may still print on or apply label(s) to the box as the box passes through the system 100.

In light of the disclosure herein, it will be appreciated that a system for folding and retaining upper flaps of a box in an outward or open configuration may include a conveyor system, a flap folding assembly, and a bander assembly. The conveyor system may be configured to advance the box at least partially through the system. The flap folding assembly may be configured to fold the upper flaps of the box to an outward or open folded configuration. The upper flaps may be folded outward and down towards outer sidewall surfaces of the box in the folded configuration. The bander assembly may be configured to apply a band or other restraint to the upper flaps of the box to retain the upper flaps in the folded configuration.

In some embodiments, the flap folding assembly includes a plurality of flap folders that are configured to fold the upper flaps of the box to a folded configuration.

In some embodiments, each of the plurality of flap folders is configured to move parallel to a first axis to insert the plurality of flap folders at least partially into an open upper end of the box and retract the plurality of flap folders from the open upper end of the box.

In some embodiments, the plurality of flap folders includes a first set of opposing flap folders.

In some embodiments, the first set of opposing flap folders are configured to move closer together and further apart from one another and parallel to an axis that is generally parallel to a length of the box.

In some embodiments, the plurality of flap folders includes a second set of opposing flap folders.

In some embodiments, the second set of opposing flap folders are configured to move closer together and further apart from one another and parallel to an axis that is generally parallel to a width of the box.

In some embodiments, each flap folder of the plurality of flap folders includes an angled plate that is configured to engage one of the upper flaps of the box as the flap folder is at least partially inserted into an open upper end of the box. The engagement of the angled plate with the upper flap of the box may be configured to bend or deflect the upper flap of the box in an outward direction.

In some embodiments, each flap folder of the plurality of flap folders also includes a first clamp member. Each of the first clamp members may be configured to be positioned adjacent to or against an inner sidewall surface of the box when the flap folders are at least partially inserted into the open upper end of the box.

In some embodiments, each flap folder of the plurality of flap folders also includes a second clamp member. The second clamp members may be configured to engage inner surfaces of the upper flaps of the box and fold the upper flaps of the box to the folded configuration.

In some embodiments, the second clamp members are configured to rotate or move linearly to engage and fold the upper flaps of the box to the folded configuration.

In some embodiments, the first and second clamp members from each flap folder are configured to clamp an upper flap and a sidewall of the box therebetween.

In some embodiments, the bander assembly includes a banding frame that is selectively movable to a functional position. The banding frame may be configured to extend at least partially around the box when in the functional position.

In some embodiments, at least a portion of the banding frame is configured to be positioned at a height between upper and lower ends of the folded upper flaps of the box when the band frame is in the functional position.

In some embodiments, the bander assembly is configured apply the band or other restraint to the folded upper flaps between the upper and lower ends of the folded upper flaps.

In some embodiments, the system includes a print assembly configured to print indicia and/or apply a label to a surface of the box.

In some embodiments, a system for folding and retaining upper flaps of a box includes a flap folding assembly and a bander assembly configured to apply a band or other restraint to the upper flaps of the box to retain the upper flaps in the folded configuration. The flap folding assembly may be configured to fold the upper flaps of the box to an open or outwardly folded configuration. The upper flaps may be folded outwardly and down towards outer sidewall surfaces of the box in the folded configuration.

The flap folding assembly may include a carriage assembly. The flap folding assembly may also include first and second opposing flap folders connected to the carriage assembly. The first and second opposing flap folders may be configured to move closer together and further apart from one another parallel to a first axis. The flap folding assembly may also include third and fourth opposing flap folders connected to the carriage assembly. The third and fourth opposing flap folders may be configured to move closer together and further apart from one another parallel to a second axis.

In some embodiments, the first and second opposing flap folders and the third and fourth opposing flap folders are configured to move parallel to a third axis. Movement of the first and second opposing flap folders and the third and fourth opposing flap folders parallel to the third axis is configured to enable the first and second opposing flap folders and the third and fourth opposing flap folders to be at least partially inserted into or retracted from an open upper end of the box.

In some embodiments, the carriage assembly comprises a sub-carriage.

In some embodiments, the sub-carriage comprises one or more first tracks or guides and one or more second tracks or guides. The first and second opposing flap folders may be movably connected to the one or more first tracks or guides to enable movement of the first and second opposing flap folders parallel to the first axis. The third and fourth opposing flap folders may be movably connected to the one or more second tracks or guides to enable movement of the third and fourth opposing flap folders parallel to the second axis.

In some embodiments, each of the flap folders comprises an angled plate that is configured to engage an upper flap of the box and outwardly bend or deflect the upper flap.

In some embodiments, each of the flap folders comprises a clamp member that is movable to fold an upper flap of the box to the folded configuration.

In some embodiments, the clamp members are configured to hold the upper flaps in the folded configuration while the bander assembly applies the band or other restraint to the upper flaps of the box to retain the upper flaps in the folded configuration.

In some embodiments, a method is provided for folding and retaining upper flaps of a box in an open or outwardly folded configuration. The method may include providing an open box with upwardly extending upper flaps. The method may also include folding the upper flaps to an open or outwardly folded configuration. The upper flaps may be folded outward and down toward outer sidewall surfaces of the box when in the folded configuration. The method may also include applying a band or other restraint to the upper flaps while the upper flaps are in the folded configuration. The band or other restraint may be configured to hold the upper flaps in the folded configuration.

In some embodiments, the method includes bending or deflecting the upper flaps outwardly prior to folding the upper flaps to the folded configuration.

In some embodiments, the method includes holding the upper flaps in the folded configuration while applying the band or other restraint to the upper flaps.

In some embodiments, the methods includes releasing the hold on the upper flaps after applying the band or other restraint to the upper flaps.

The present invention may be embodied in other specific forms without departing from its spirit or essential characteristics. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A system for folding and retaining upper flaps of a box in an outward or open configuration, the system comprising:

a conveyor system configured to advance the box at least partially through the system;

a flap folding assembly configured to fold the upper flaps of the box to an outward or open folded configuration, the upper flaps being folded outward and down towards outer sidewall surfaces of the box in the folded configuration; and a bander assembly configured to apply a band or other restraint to the upper flaps of the box to retain the upper flaps in the folded configuration.

2. The system of claim 1, wherein the flap folding assembly comprises a plurality of flap folders that are configured to fold the upper flaps of the box to a folded configuration.

3. The system of claim 2, wherein each of the plurality of flap folders is configured to move parallel to a first axis to insert the plurality of flap folders at least partially into an open upper end of the box and retract the plurality of flap folders from the open upper end of the box.

4. The system of claim 2, wherein the plurality of flap folders comprises a first set of opposing flap folders.

5. The system of claim 4, wherein the first set of opposing flap folders are configured to move closer together and further apart from one another and parallel to an axis that is generally parallel to a length of the box.

6. The system of claim 4, wherein the plurality of flap folders comprises a second set of opposing flap folders.

7. The system of claim 6, wherein the second set of opposing flap folders are configured to move closer together and further apart from one another and parallel to an axis that is generally parallel to a width of the box.

8. The system of claim 2, wherein each flap folder of the plurality of flap folders comprises an angled plate that is configured to engage one of the upper flaps of the box as the flap folder is at least partially inserted into an open upper end of the box, wherein engagement of the angled plate with the upper flap of the box is configured to bend or deflect the upper flap of the box in an outward direction.

9. The system of claim 8, wherein each flap folder of the plurality of flap folders further comprises a first clamp member, each of the first clamp members being configured to be positioned adjacent to or against an inner sidewall surface of the box when the flap folders are at least partially inserted into the open upper end of the box.

10. The system of claim 9, wherein each flap folder of the plurality of flap folders further comprises a second clamp member, the second clamp members being configured to engage inner surfaces of the upper flaps of the box and fold the upper flaps of the box to the folded configuration.

11. The system of claim 10, wherein the second clamp members are configured to rotate or move linearly to engage and fold the upper flaps of the box to the folded configuration.

12. The system of claim 10, wherein the first clamp member and the second clamp member from each flap folder are configured to clamp an upper flap and a sidewall of the box therebetween.

13. The system of claim 1, wherein the bander assembly comprises a banding frame that is selectively movable to a functional position, wherein the banding frame is configured to extend at least partially around the box when in the functional position.

14. The system of claim 13, wherein at least a portion of the banding frame is configured to be positioned at a height between upper and lower ends of the folded upper flaps of the box when the banding frame is in the functional position, and wherein the bander assembly is configured apply the band or other restraint to the folded upper flaps between the upper and lower ends of the folded upper flaps.

15. The system of claim 1, further comprising a print assembly configured to print indicia and/or apply a label to a surface of the box.

16. A system for folding and retaining upper flaps of a box, the system comprising:

a flap folding assembly configured to fold the upper flaps of the box to an open or outwardly folded configuration, the upper flaps being folded outwardly and down towards outer sidewall surfaces of the box in the folded configuration, the flap folding assembly comprising:

a carriage assembly;

first and second opposing flap folders connected to the carriage assembly, the first and second opposing flap folders being configured to move closer together and further apart from one another parallel to a first axis; and third and fourth opposing flap folders connected to the carriage assembly, the third and fourth opposing flap folders being configured to move closer together and further apart from one another parallel to a second axis; and a bander assembly configured to apply a band or other restraint to the upper flaps of the box to retain the upper flaps in the folded configuration.

17. The system of claim 16, wherein each of the flap folders comprises an angled plate that is configured to engage an upper flap of the box and outwardly bend or deflect the upper flap.

18. The system of claim 16, wherein the first and second opposing flap folders and the third and fourth opposing flap folders are configured to move parallel to a third axis, wherein movement of the first and second opposing flap folders and the third and fourth opposing flap folders parallel to the third axis is configured to enable the first and second opposing flap folders and the third and fourth opposing flap folders to be at least partially inserted into or retracted from an open upper end of the box.

19. The system of claim 18, wherein the carriage assembly comprises a sub-carriage.

20. The system of claim 19, wherein the sub-carriage comprises one or more first tracks or guides and one or more second tracks or guides, the first and second opposing flap folders being movably connected to the one or more first tracks or guides to enable movement of the first and second opposing flap folders parallel to the first axis, and the third and fourth opposing flap folders being movably connected to the one or more second tracks or guides to enable movement of the third and fourth opposing flap folders parallel to the second axis.

21. The system of claim 20, wherein each of the flap folders comprises a clamp member that is movable to fold an upper flap of the box to the folded configuration.

22. The system of claim 21, wherein the clamp members are configured to hold the upper flaps in the folded configuration while the bander assembly applies the band or other restraint to the upper flaps of the box to retain the upper flaps in the folded configuration.

23. A method for folding and retaining upper flaps of a box in an open or outwardly folded configuration, the method comprising:

providing an open box with upwardly extending upper flaps;

folding the upper flaps to an open or outwardly folded configuration, the upper flaps being folded outward and down toward outer sidewall surfaces of the box when in the folded configuration; and applying a band or other restraint to the upper flaps while the upper flaps are in the folded configuration, the band or other restraint being configured to hold the upper flaps in the folded configuration.

24. The method of claim 23, further comprising bending or deflecting the upper flaps outwardly prior to folding the upper flaps to the folded configuration.

25. The method of claim 23, further comprising holding the upper flaps in the folded configuration while applying the band or other restraint to the upper flaps.

26. The method of claim 25, further comprising releasing the hold on the upper flaps after applying the band or other restraint to the upper flaps.

* * * * *